Dec. 1, 1925.
E. RYDER
1,563,403
WATER CIRCULATOR FOR MOTOR VEHICLES
Filed Oct. 6, 1924
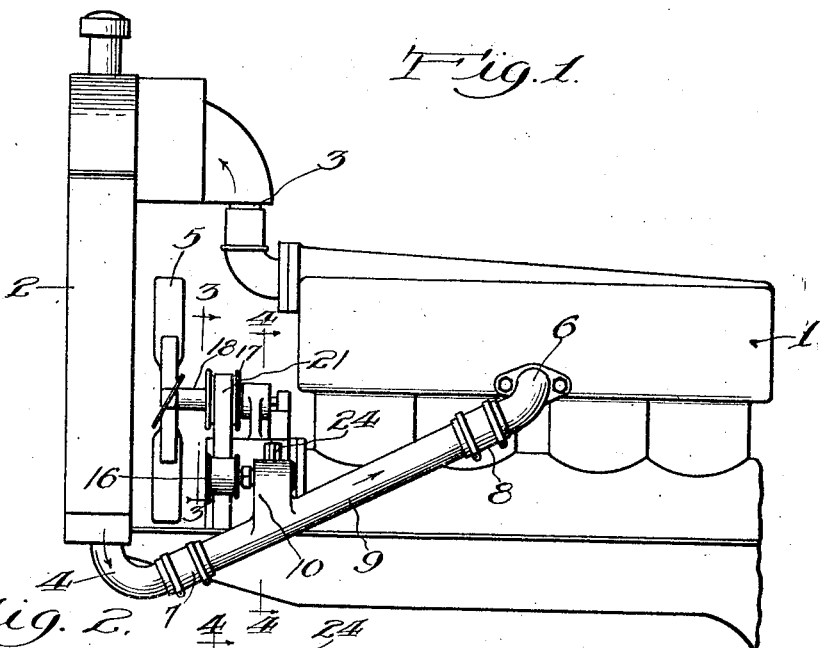
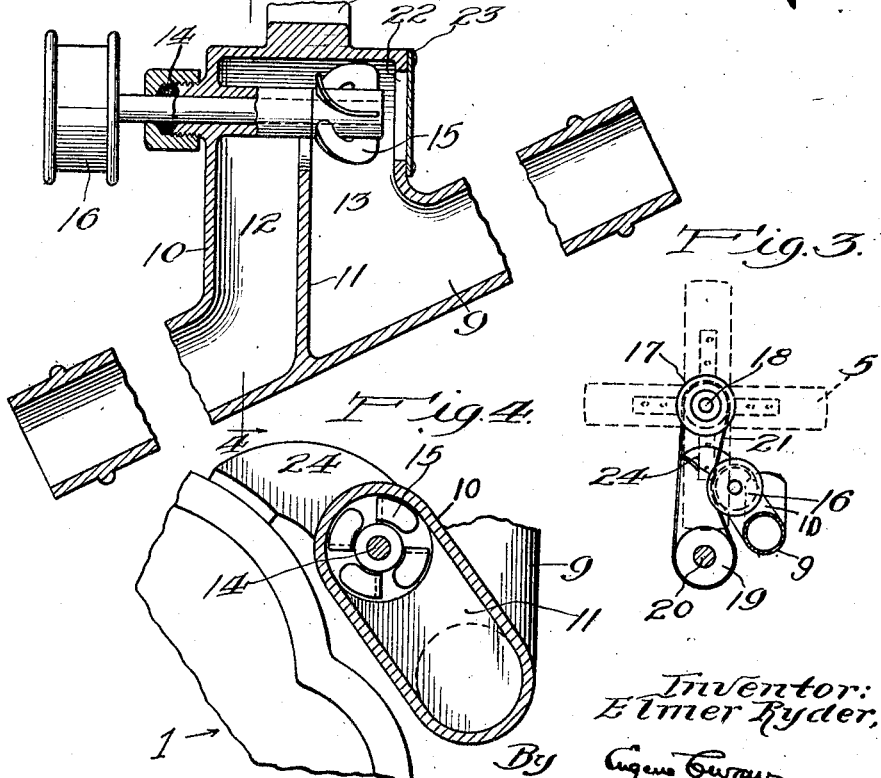
Inventor:
Elmer Ryder Patented Dec. 1, 1925.

1,563,403

UNITED STATES PATENT OFFICE.

ELMER RYDER, OF BERWYN, ILLINOIS.

WATER CIRCULATOR FOR MOTOR VEHICLES.

Application filed October 6, 1924. Serial No. 742,037.

*To all whom it may concern:*

Be it known that I, ELMER RYDER, a citizen of the United States, residing at Berwyn, in the county of Cook and State of Illinois, have invented new and useful Improvements in Water Circulators for Motor Vehicles, of which the following is a specification.

This invention relates to power driven water circulators for motor vehicles, and more particularly for Ford cars as an accessory.

One object of my invention is to combine the circulator with the outlet connecting pipe in a single fitting so that it may be substituted for the ordinary straight pipe of the Ford equipment and be connected to the radiator outlet and cylinder jacket inlet fittings by the same hose sections and clamps as furnished with the Ford equipment, thus making it unnecessary to discard more than the straight pipe which comes with such equipment.

A further object of my invention is to locate the water circulating device adjacent the lower end of its pipe section, so that the driving pulley of the circulator may bear against the outside fan belt to be driven thereby, and thus avoid the use and expense of an extra belt or the overlapping of belts with resultant expense and wear as when the circulator is located in the outlet fitting of the radiator.

The invention consists further in the matters hereinafter described and claimed.

In the accompanying drawings—

Fig. 1 is a side view of a Ford engine and radiator assembly, showing my improved combined outlet pipe connection and circulator applied to the cooling system thereof;

Fig. 2 is a longitudinal sectional view through the combined circulator and pipe section;

Fig. 3 is a vertical sectional view on line 3—3 of Fig. 1; and

Fig. 4 is a vertical sectional view taken on line 4—4 of Fig. 1.

In the drawings, 1 indicates a Ford engine; 2, the radiator in front of the same; 3, 4, the radiator inlet and outlet fittings, respectively; and 5, the fan for drawing air through the radiator, as customary in this type of assembly.

In an assembly of the character shown, the water jacket of the motor 1 has on one side an elbow fitting 6, which is clamped by cap screws to the cylinder block, as customary in this design. Between the radiator outlet fitting 4, at the bottom of the radiator, and the water jacket inlet fitting 6, the standard Ford equipment includes a metal pipe section, which extends at an inclination upward from the radiator outlet fitting 4 and serves to carry cooling water from the bottom of the radiator into the side of the water jacket, as used in the Ford cooling system. This pipe is flexibly connected to the fittings 4 and 6 by short rubber hose sections 7, 8, about which are the usual metal hose clips, as shown.

The object of my invention is to provide, in place of this pipe section, a fitting which is in the form of a combined pipe section and water circulator. This fitting I have shown at 9 in the drawings, and it will be noted that the same follows the general form of the regular Ford pipe and is connected with the fittings 4 and 6 by the same hose connections 7, 8 as furnished with the Ford equipment. Thus, in applying my device to a Ford car, it is necessary to discard only the pipe section between these fittings. The hose sections 7, 8 are retained and, with no gaskets required, my device is not only easy of application but less expensive than when the entire pipe and water jacket inlet fitting with its adjacent hose section are discarded, as heretofore. Moreover, in using the hose sections 7, 8, a suitable flexible connection is maintained between the fitting 9 and the adjacent parts of the radiator and cylinder so as to yield under strains and twists to which the assembly is subjected when in use.

The circulator includes a casing 10 cast integral with the pipe section 9 and arranged to extend outward therefrom, as shown. A partition wall 11 is cast on the inside of the pipe 9, and extends from its bottom wall into the chamber made by the casing 10. This provides the casing 10 with two vertical water passages 12, 13, which communicate above the upper end of the partition wall 11, as shown in Fig. 2. Journaled in the casing 10 is a shaft 14 horizontally arranged and having at its inner end a suitable impeller 15 of the curved blade type and operating generally on the Sirocco principle. This impeller 15 is preferably located above the passage 13 and when rotated serves to cause the cooling water to flow upward through the pipe 9 whether the water is cool or warm enough to flow by thermosiphon action as depended upon in the Ford cooling system.

The outer end of the shaft 14 carries a grooved pulley 16 positioned to be in the plane of the grooved pulley 17 on the fan shaft 18 and the pulley 19 on the crank shaft 20 of the engine. The pulley 16 is at one side of the fan belt 21 and bears against said belt sufficiently to cause the belt when the engine is in operation to rotate the impeller 15 and circulate the cooling water through the system by power. By having the pulley 16 grooved, it guides the belt and keeps the belt from slipping off the pulley 19, as sometimes happens in Ford equipment. The casing 10 is near the lower end of the pipe section 9, thus bringing the pulley 16 closely adjacent the pulley 19 and causing the latter to increase the wrap of the fan belt on the pulley 19 to gain added driving friction.

The casing 10 is provided at the inner end of the shaft 14 with a hole 22 normally closed by a plate 23. This construction is employed to enable the impeller to be assembled on its shaft and moreover so that access may be had to the impeller for cleaning or repair.

With the circulator combined with the pipe 9, the casing 10 is supported by this pipe and may be readily made as a single casting and, being connected with the fittings 4 and 6 by the hose sections, no machining of the pipe ends is required to hold the parts in place. Moreover, no extra belt is required to drive the impeller from the fan shaft 18, thus saving in belt cost and maintenance. With the impeller 5 located in the housing 10, there is no obstruction offered by the impeller or its shaft or its bearing to the normal flow of the cooling water through the system under thermosiphon action, and therefore the circulator does not interfere with such action of the system should the circulator become impaired or inoperative for any reason, either by breakage of the parts or by breakage of the fan belt or slippage on the pulley.

When the pulley 16 is rotated in the direction of the arrow in Fig. 3, it will be noted that the torque on the pipe 9 is in the direction tending to turn it inward toward the motor assembly. With only flexible hose connections as the means of holding the pipe in place, I provide the casing 10 with an outwardly projecting finger or part 24, which bears downward against the outer casing of the motor to prevent the driving torque of the pulley 16 from turning the fitting out of place. This finger 24, together with the hose sections 7, 8, provides a three point flexible suspension for the fitting 9.

While I have shown and described herein in detail a combined outlet pipe connection and water circulator of my invention, it is of course to be understood that the details of construction and arrangement of parts may be variously changed and modified without departing from the spirit and scope of my invention.

I claim as my invention:

1. The combination with the outlet fitting of a motor vehicle radiator and the inlet fitting of the water jacket of the motor, of a metal pipe interposed between said fittings and flexibly connected therewith by hose sections, a water circulator combined with said pipe and having a driving pulley for actuation by the motor, and a lug carried by said pipe and engaging the motor casing for holding the pipe against turning under the driving torque of the pulley during the operation of the circulator.

2. The combination with the outlet fitting of a motor vehicle radiator and the inlet fitting of the water jacket of the motor, of a water circulator interposed between said fittings and having a flexible three point suspension, two points being by flexible hose connections with said fittings and the third point being by a lug on the circulator bearing against the motor casing, said circulator being driven by the motor.

3. The combination with the radiator outlet and water jacket inlet fittings of a Ford power plant assembly, of an inclined metal pipe between said fittings and flexibly connected therewith by the hose connections of the Ford equipment, a water circulator having a casing cast integral with said pipe and projecting outward therefrom adjacent the fan belt, a horizontal shaft journaled in said casing, a pulley thereon and engaging the fan belt to be driven thereby, and an impeller in said casing and fixed to said shaft to circulate water by power through the cooling system, said casing having a lug bearing downward against the motor casing to hold the pipe against turning under the driving torque of the pulley.

In testimony that I claim the foregoing as my invention, I affix my signature, this 2nd day of October, 1924.

ELMER RYDER.